(12) United States Patent
Solar et al.

(10) Patent No.: US 11,364,839 B2
(45) Date of Patent: *Jun. 21, 2022

(54) VEHICULAR CONTROL SYSTEM USING A CAMERA AND LIDAR SENSOR TO DETECT OTHER VEHICLES

(71) Applicant: MAGNA ELECTRONICS INC., Auburn Hills, MI (US)

(72) Inventors: Martin Solar, Erlenbach (DE); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 458 days.

This patent is subject to a terminal disclaimer.

(21) Appl. No.: 16/699,893

(22) Filed: Dec. 2, 2019

(65) Prior Publication Data

US 2020/0101890 A1    Apr. 2, 2020

Related U.S. Application Data

(63) Continuation of application No. 15/413,463, filed on Jan. 24, 2017, now Pat. No. 10,493,899, which is a
(Continued)

(51) Int. Cl.
*B60Q 1/14*     (2006.01)
*B60Q 1/00*     (2006.01)
(Continued)

(52) U.S. Cl.
CPC .......... *B60Q 1/143* (2013.01); *B60Q 1/0023* (2013.01); *B60R 11/04* (2013.01); *B60W 30/14* (2013.01);
(Continued)

(58) Field of Classification Search
CPC ............... B60Q 1/143; B60Q 1/0023; B60Q 2300/132; B60Q 2300/41; B60Q 2300/42;
(Continued)

(56) References Cited

U.S. PATENT DOCUMENTS 5,550,677 A    8/1996  Schofield et al.
5,670,935 A    9/1997  Schofield et al.
(Continued)

OTHER PUBLICATIONS

P. Papadimitratos, A. de La Fortelle, K. Evenssen, R. Brignolo and S. Cosenza, "Vehicular Communication Systems: Enabling Technologies, Applications, and Future Outlook on Intelligent Transportation," IEEE Communications Magazine, Nov. 2009, pp. 84-95 (Year: 2009).

(Continued)

*Primary Examiner* — Wei (Victor) Y Chan
(74) *Attorney, Agent, or Firm* — Honigman LLP

(57) ABSTRACT

A vehicular control system includes a control and a plurality of sensors that include at least a camera and a 3D point-cloud LIDAR sensor. The control is operable to process captured image data to determine presence of another vehicle and to process captured 3D point-cloud LIDAR data to determine presence of the other vehicle. The control, responsive at least in part to processing of captured image data and captured 3D point-cloud LIDAR data, determines presence of the other vehicle when the other vehicle is (i) in the field of view of the camera and/or (ii) in the field of sensing of the 3D point-cloud LIDAR sensor, and responsive to determination of the other vehicle, the control at least in part controls at least one vehicle function of the equipped vehicle.

20 Claims, 1 Drawing Sheet

Related U.S. Application Data continuation of application No. 15/083,894, filed on Mar. 29, 2016, now Pat. No. 9,555,736.

(60) Provisional application No. 62/142,705, filed on Apr. 3, 2015.

(51) Int. Cl.
  *B60R 11/04* (2006.01)
  *G08G 1/16* (2006.01)
  *B60W 30/14* (2006.01)

(52) U.S. Cl.
  CPC ............ *G08G 1/161* (2013.01); *G08G 1/163* (2013.01); *G08G 1/164* (2013.01); *G08G 1/166* (2013.01); *B60Q 2300/132* (2013.01); *B60Q 2300/41* (2013.01); *B60Q 2300/42* (2013.01); *B60Q 2300/45* (2013.01); *B60W 2420/42* (2013.01); *B60W 2420/52* (2013.01); *B60W 2556/65* (2020.02)

(58) Field of Classification Search
  CPC .... B60Q 2300/45; B60R 11/04; B60W 30/14; B60W 2556/65; B60W 2420/42; B60W 2420/52; G08G 1/161; G08G 1/163; G08G 1/164; G08G 1/166
  See application file for complete search history.

(56) References Cited

U.S. PATENT DOCUMENTS

| | | | |
|---|---|---|---|
| 5,796,094 | A | 8/1998 | Schofield et al. |
| 5,949,331 | A | 9/1999 | Schofield et al. |
| 6,396,397 | B1 | 5/2002 | Bos et al. |
| 6,690,268 | B2 | 2/2004 | Schofield et al. |
| 6,693,517 | B2 | 2/2004 | McCarthy et al. |
| 7,038,577 | B2 | 5/2006 | Pawlicki et al. |
| 7,156,796 | B2 | 1/2007 | Makley |
| 7,580,795 | B2 | 8/2009 | McCarthy et al. |
| 7,720,580 | B2 | 5/2010 | Higgins-Luthman |
| 7,855,755 | B2 | 12/2010 | Weller et al. |
| 8,013,780 | B2 | 9/2011 | Lynam |
| 8,229,663 | B2 | 7/2012 | Zeng et al. |
| 8,666,591 | B2 | 3/2014 | Stahlin et al. |
| 8,798,841 | B1 | 8/2014 | Nickolaou et al. |
| 8,849,494 | B1 | 9/2014 | Herbach et al. |
| 8,996,228 | B1 | 3/2015 | Ferguson et al. |
| 9,008,890 | B1 | 4/2015 | Herbach et al. |
| 9,079,587 | B1 | 7/2015 | Rupp et al. |
| 9,098,753 | B1 | 8/2015 | Zhu et al. |
| 9,147,219 | B2 | 9/2015 | Binion et al. |
| 9,193,355 | B2 | 11/2015 | Ferguson et al. |
| 9,221,461 | B2 | 12/2015 | Ferguson et al. |
| 9,254,846 | B2 | 2/2016 | Dolgov et al. |
| 9,255,989 | B2 | 2/2016 | Joshi et al. |
| 9,262,787 | B2 | 2/2016 | Binion et al. |
| 9,476,983 | B2 | 10/2016 | Zeng |
| 9,511,767 | B1 | 12/2016 | Okumura et al. |
| 9,534,910 | B2 | 1/2017 | Okumura |
| 9,541,410 | B1 | 1/2017 | Herbach et al. |
| 9,555,736 | B2 | 1/2017 | Solar et al. |
| 9,734,417 | B2 | 8/2017 | Ferguson et al. |
| 9,804,597 | B1 | 10/2017 | Ferguson et al. |
| 9,831,630 | B2 | 11/2017 | Lipson |
| 9,875,417 | B2 | 1/2018 | Ferguson et al. |
| 9,892,567 | B2 | 2/2018 | Binion et al. |
| 9,933,784 | B1 | 4/2018 | Herbach et al. |
| 9,959,764 | B1 | 5/2018 | Binion et al. |
| 10,493,899 | B2 | 12/2019 | Solar et al. |
| 2004/0016870 | A1 | 1/2004 | Pawlicki et al. |
| 2008/0273752 | A1 | 11/2008 | Zhu et al. |
| 2009/0085775 | A1 | 4/2009 | Otsuka et al. |
| 2009/0251355 | A1 | 10/2009 | Nanami |
| 2010/0091513 | A1 | 4/2010 | Kamioka |
| 2010/0182432 | A1 | 7/2010 | Augst |
| 2011/0054716 | A1 | 3/2011 | Stahlin et al. |
| 2012/0062743 | A1 | 3/2012 | Lynam et al. |
| 2012/0218412 | A1 | 8/2012 | Dellantoni et al. |
| 2012/0290146 | A1 | 11/2012 | Dedes et al. |
| 2013/0090806 | A1 | 4/2013 | Hahne |
| 2013/0135117 | A1 | 5/2013 | Morimoto |
| 2013/0242284 | A1 | 9/2013 | Zeng |
| 2013/0325241 | A1 | 12/2013 | Lombrozo et al. |
| 2014/0032012 | A1 | 1/2014 | Joshi et al. |
| 2014/0052367 | A1 | 2/2014 | Hahne |
| 2014/0067187 | A1 | 3/2014 | Ferguson et al. |
| 2014/0236414 | A1 | 8/2014 | Droz et al. |
| 2014/0330479 | A1 | 11/2014 | Dolgov et al. |
| 2015/0112504 | A1 | 4/2015 | Binion et al. |
| 2015/0112543 | A1 | 4/2015 | Binion et al. |
| 2015/0112730 | A1 | 4/2015 | Binion et al. |
| 2015/0124096 | A1 | 5/2015 | Koravadi |
| 2015/0153184 | A1 | 6/2015 | Mudalige et al. |
| 2015/0158499 | A1 | 6/2015 | Koravadi |
| 2015/0219764 | A1 | 8/2015 | Lipson |
| 2015/0251599 | A1 | 9/2015 | Koravadi |
| 2015/0266471 | A1 | 9/2015 | Ferguson et al. |
| 2015/0329111 | A1 | 11/2015 | Prokhorov |
| 2015/0352953 | A1 | 12/2015 | Koravadi |
| 2016/0018524 | A1 | 1/2016 | Zeng |
| 2016/0036917 | A1 | 2/2016 | Koravadi et al. |
| 2016/0162743 | A1 | 6/2016 | Chundrlik, Jr. et al. |
| 2016/0205656 | A1* | 7/2016 | Zeng ............... H04W 4/40 455/456.1 |
| 2016/0210853 | A1 | 7/2016 | Koravadi |
| 2016/0272207 | A1 | 9/2016 | Dolgov et al. |
| 2017/0248962 | A1 | 8/2017 | Hasberg et al. |

OTHER PUBLICATIONS

P. Popovski, "Ultra-Reliable Communication in 5G Wireless Systems," 1st International Conference on 5G for Ubiquitous Connectivity (5GU), 2014, pp. 146-151 (Year: 2014).

\* cited by examiner

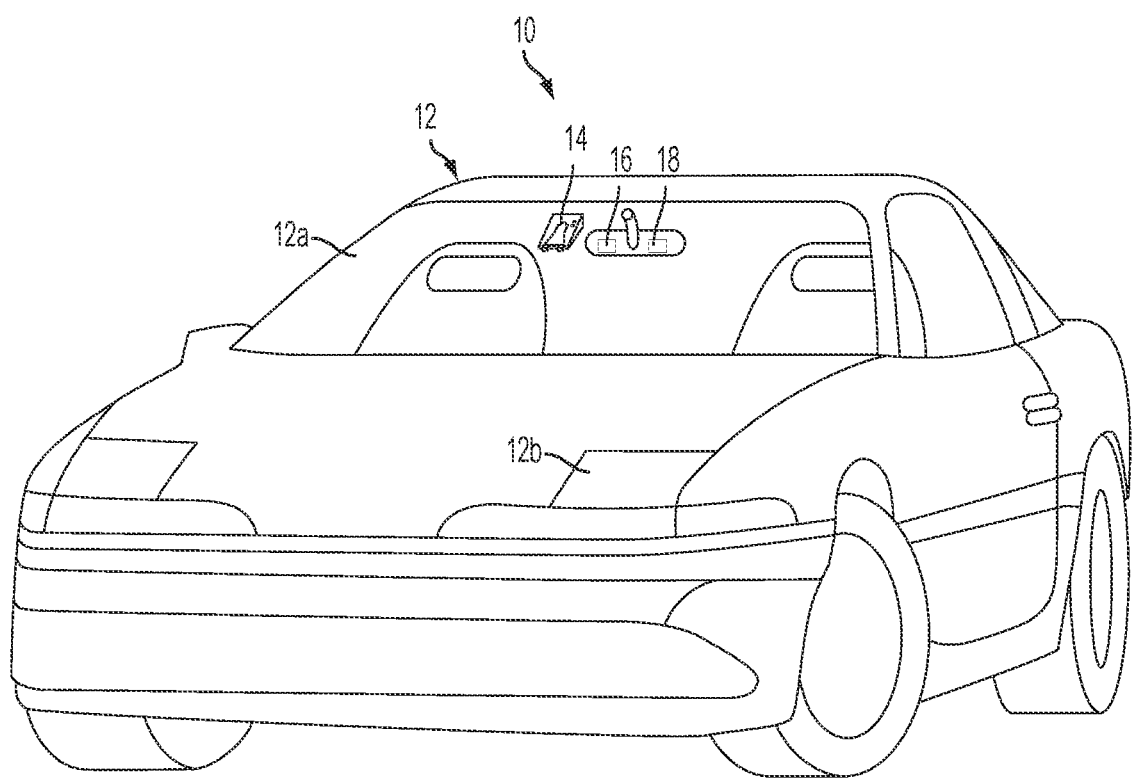

VEHICULAR CONTROL SYSTEM USING A CAMERA AND LIDAR SENSOR TO DETECT OTHER VEHICLES

CROSS REFERENCE TO RELATED APPLICATIONS

The present application is a continuation of U.S. patent application Ser. No. 15/413,463, filed Jan. 24, 2017, now U.S. Pat. No. 10,493,899, which is a continuation of U.S. patent application Ser. No. 15/083,894, filed Mar. 29, 2016, now U.S. Pat. No. 9,555,736, which claims the filing benefits of U.S. provisional application Ser. No. 62/142,705, filed Apr. 3, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Also, communication systems for vehicles may provide for communication between vehicles, between vehicles and infrastructure, and/or between a vehicle and a remote server. Such car2car or V2V and car2X or V2X technology provides for communication between vehicles based on information provided by one or more vehicles and/or information provided by infrastructure or a remote server or the like. Examples of such systems are described in U.S. Pat. No. 7,580,795 and/or U.S. Publication Nos. US 2012-0218412, published Aug. 30, 2012, and/or US 20124-0062743, published Mar. 15, 2012, which are hereby incorporated herein by reference in their entireties.

SUMMARY OF THE INVENTION

The present invention provides a driver assistance system or headlamp control system for a vehicle that utilizes one or more sensors or cameras to capture data representative of images exterior and forward of the vehicle, and provides a control that, responsive to processing of data captured by a sensor of the vehicle, and responsive to a V2V or V2I or V2X communication or the like received by a receiver of the vehicle, is operable to determine the presence or approach of another traffic participant or vehicle ahead of the equipped vehicle, such as on the road being traveled by the equipped vehicle or on another road parallel to the road being traveled by the equipped vehicle or on a cross road that intersects the road being traveled by the equipped vehicle.

According to an aspect of the present invention, a driver assistance system of a vehicle includes a forward sensing sensor (such as a forward viewing camera or a forward sensing non-imaging sensor, such as an imaging thermal sensor or a 3D point-cloud LIDAR sensor or the like) disposed at a vehicle equipped with the driver assistance system and having a field of view forward of the equipped vehicle. A processor is operable to process data captured by the forward sensing sensor to determine the presence of another vehicle (such as another vehicle on the road traveled by the equipped vehicle or on another road or lane adjacent to or parallel to the road traveled by the equipped vehicle). A receiver is disposed at the equipped vehicle and is operable to receive a wireless communication of information pertaining to other vehicles or traffic participants (such as other vehicles or motorcyclists or bicyclists or pedestrians) in the vicinity of the equipped vehicle. A control is responsive to processing of captured data and responsive to received information, and the control is operable to adjust a headlamp beam setting of the equipped vehicle responsive to a determination, via processing of captured data, that another vehicle is present ahead of the equipped vehicle, such as at a location where the headlamps of the equipped vehicle, if on a higher beam setting, would bother the driver of the other vehicle determined to be present ahead of the equipped vehicle, and the control is operable to adjust the headlamp beam setting responsive to a determination, via received information, of another vehicle or traffic participant in the vicinity of the equipped vehicle and approaching the path of travel of the equipped vehicle such that the headlamps of the equipped vehicle, if on the higher beam setting, may bother the other traffic participant when the traffic participant arrives at the path of travel of the equipped vehicle or otherwise is at or near the path of travel of the equipped vehicle.

The system provides thus enhanced headlamp control (and/or other function or functions) when an oncoming or preceding or crossing other vehicle (or other traffic participant) may not be detected by the forward viewing sensor (such as due to an obstruction or weather condition or a hill or curvature of the road), so that the control adjusts the headlamp beam setting to a lower beam setting so that the driver of the oncoming or preceding or crossing vehicle or other traffic participant is not bothered by the higher beams of the headlamps when a lower beam setting is appropriate.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a vision system that incorporates cameras in accordance with the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and may provide an output to a display device for displaying images representative of the captured image data. The system is responsive to communications from other vehicles, such as via a V2V communication or other wireless communication, to enhance detection of other vehicles on the road that may not be within the field of view of the camera and/or may not be readily detectable or discernible in captured image data processed by the image processor. Responsive to outputs of the image processor and the V2V communication receiver, the system may control or adjust a headlamp of the vehicle, such as when the system determines an oncoming or preceding or crossing vehicle or other traffic participant (such as approaching from ahead of the equipped vehicle and not in view of the forward viewing sensor or camera), as discussed below.

Referring now to the drawings and the illustrative embodiments depicted therein, a driver assistance system or imaging system or vision system 10 of a vehicle 12 includes at least one exterior facing imaging sensor or camera 14, such as a forward facing imaging sensor or camera (such as at the windshield 12a), and the system may optionally include multiple exterior facing imaging sensors or cameras, such as a rearwardly facing camera at the rear of the vehicle, and a sidewardly/rearwardly facing camera at respective sides of the vehicle (FIG. 1). The camera or cameras capture image data exterior of the vehicle, with the camera having a lens for focusing images at or onto an imaging array or imaging plane or imager of the camera. The driver assistance system 10 also includes a receiver 16 that receives wireless communications from exterior the vehicle (such as wireless communications via a vehicle-to-vehicle or vehicle-to-infrastructure communication system or the like), and a control 18 (although shown in the interior rearview mirror assembly of the vehicle, clearly the receiver and control may be disposed at any suitable location in the vehicle, such as at the camera module or at a separate in-cabin or in-engine compartment location or the like) is operable to adjust a headlamp beam setting of the headlamps 12b of the vehicle responsive to (i) processing of data captured by the forward sensing sensor 14 and (ii) processing of information received via the receiver 16, as discussed below.

The forward viewing camera 14 may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system includes a control or electronic control unit (ECU) or processor that is operable to process image data captured by the camera or cameras and may detect objects or the like and/or provide displayed images at a display device for viewing by the driver of the vehicle (such as being part of or incorporated in or at an interior rearview mirror assembly of the vehicle or elsewhere at or in the vehicle). The data transfer or signal communication from the camera to the ECU may comprise any suitable data or communication link, such as a vehicle network bus or the like of the equipped vehicle.

Many vehicles today use a forward viewing camera and image processor to detect other vehicles on the road ahead of the equipped vehicle, whereby a control system may control or adjust the headlights of the equipped vehicle when an oncoming, preceding or crossing vehicle approaches the equipped vehicle from ahead or in front of the equipped vehicle (such as by utilizing aspects of the headlamp control systems described in U.S. Pat. No. 5,796,094, which is hereby incorporated herein by reference in its entirety). Some vehicle driver assist systems have utilized map fusion, radar fusion and/or the like to enhance performance of the driver assist system. Vehicle-to-vehicle (V2V) fusion may be provided for a modified adaptive cruise control (ACC) performance if there is slow traffic on the road ahead of the equipped vehicle and ahead of the sensing range of the forward viewing camera/radar.

Such a forward viewing sensor may have a range of about 300-500 meters if it is line of sight (relatively flat road with no obstructions). Because a V2V or V2I communication may be a Wi-Fi (802.11p) communication, the communication signal has similar range limits with reduced range if obstructions are present. In Europe it has been proposed to use 4G or 5G for vehicle communications. It has improved range, but has other potential issues. One potential issue is that the vehicle data is sent to a cloud where other people can retrieve it, which results in delays in accessing the data which can be problematic and not safety critical capable.

The present invention provides a system with camera data and vehicle communication data fusion that is used with advanced lighting control and lighting patterns so as to avoid having the bright or high beam lights on that may blind the drivers of other vehicles that are "off the grid" and not yet viewable by the camera (or other forward viewing or forward sensing sensor, such as a radar sensor or lidar sensor or the like). For example, the forward sensing sensor may comprise a 3D-mapping Lidar that captures a point-cloud of sensed data, and preferably comprises a solid-state 3D point-cloud Lidar such as a 3D Lidar for ADAS, Autonomous Vehicles and 3D Mapping, such as the type available from Quanergy Systems Inc. of Sunnyvale, Calif. The forward sensing sensor may comprise an automotive night vision camera sensor such as FLIR's 320×240 Vanadium Oxide uncooled infrared sensor utilizing Autovox™ technology and based on uncooled microbolometer technology developed by FLIR Systems, Inc. of Wilsonville, Oreg. and supplied by Autoliv Inc. of Auburn Hills, Mich., for use for a night vision system on likes of BMW vehicles. Optionally, the sensor may, for example, utilize aspects of the sensors and systems described in U.S. patent application Ser. No. 15/076,915, filed Mar. 22, 2016 and published Sep. 29, 2016 as U.S. Publication No. US-2016-0280133, and/or Ser. No. 14/957,708, filed Dec. 3, 2015 and published Jun. 9, 2016 as U.S. Publication No. US-2016-0162743, and/or U.S. Pat. No. 8,013,780, which are hereby incorporated here by reference in their entireties.

The system may be responsive to either form of vehicle communications from or pertaining to other vehicles in the vicinity of the equipped vehicle, such as V2V communications (where the vehicles communicate information directly to one another) or 4G or 5G communications (where the vehicles communicate information to the cloud and access other vehicle information via the internet and cell towers). The system thus provides enhanced automatic or intelligent headlamp control that provides enhanced detection of other vehicles via vehicle-communicated information that may or may not be detected by the camera or sensor of the equipped vehicle. The system thus adjust the headlamps to dim or adapt the beam pattern before the oncoming or preceding or crossing vehicle is in range of the headlamps (and camera) to avoid blinding the driver of the oncoming or preceding or crossing vehicle or other traffic participant (or participants) before the headlamps are dimmed. For example, if the system determines (responsive to a V2V communication or the like) that an approaching vehicle or other traffic participant (such as a motorcyclist or a pedestrian with a smartphone, which may communicate via a V2V or V2I or V2X communication system) is coming up a hill towards the equipped vehicle and ahead of the equipped vehicle, the system may dim the headlamps before the approaching vehicle is in the line of the headlamps of the equipped vehicle (even though the forward viewing camera and image processor may not yet have determined the presence of the approaching vehicle).

The system of the present invention thus may, for example, adapt the lighting pattern for crossing traffic (which is not yet in the camera's field of view or not detectable by the camera), such that the headlamps are adjusted to a lower beam setting when the system determines that cross traffic is approaching from either side of the vehicle, such as at an intersection ahead of the vehicle. The system of the present invention may also adapt the lighting pattern for pedestrians and other traffic participants (such as a pedestrian with a smartphone, which may communicate via a V2X communication system), to limit glare to the pedestrians generally ahead of the vehicle and not in the field of view of the camera, such as pedestrians at the side of an intersection and preparing or beginning to cross the street ahead of the vehicle.

Optionally, the system of the present invention may adapt the lighting pattern for traffic on a parallel road which is just partly visible but could be glared. Such a system would utilize V2V or V2I communication (or other vehicle communication) information to determine if other vehicles are on the parallel road (such as the opposite side of a divided highway or the like) where the view to the other road may be partially obstructed (such as via bushes or guard rails or the like). Thus, even if the camera's view of an approaching vehicle is partially obstructed, the system may adjust the headlamp setting to a lower beam setting if the system determines that another vehicle is at the other road within a threshold distance to the equipped vehicle.

Optionally, the system of the present invention may use the information of present but non-visible or non-detected traffic ahead of the equipped vehicle at or within or outside of a threshold distance to adapt timers and thresholds of light patterns so as to achieve smoother behavior or adjustment of the headlamp beam settings. For example, the system may ramp down the headlamp setting to a lower beam setting when the system determines an approach of a vehicle that is not yet within a range that the higher beam setting would be a nuisance, but is approaching that range.

Optionally, the system of the present invention may reduce misdetections of other vehicles at low visibility conditions, such as fog, rain or snow conditions, by utilizing V2V communications or the like to determine when other vehicles are near or approaching the equipped vehicle, even if those other vehicles are not detectable by the camera system of the vehicle.

When using the V2V or V2I information or data, the system may use an electronic horizon since the road information needs can be combined with the V2V or V2I data or the like to get even more data and performance improvements.

Thus, the present invention includes a control that, responsive to processing of data captured by a sensor of the vehicle, and responsive to a V2V or V2I communication or the like received by a receiver of the vehicle, is operable to determine the presence or approach of another vehicle ahead of the equipped vehicle, such as on the road being traveled by the equipped vehicle or on another road parallel to the road being traveled by the equipped vehicle or on a cross road that intersects the road being traveled by the equipped vehicle. The system provides enhanced headlamp control (and/or other function) when the approaching vehicle is not detected by the forward viewing camera (such as due to an obstruction or weather condition or a hill or curvature of the road), so that the driver of the approaching vehicle is not bothered by the higher beams of the headlamps when a lower beam setting is appropriate.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517; 7,156,796 and/or 7,580,795, and/or U.S. Publication Nos. US-2012-0218412, US-2012-0062743, US-2015-0251599; US-2015-0158499; US-2015-0124096; US-2015-0352953 and/or US-2016-0036917, and/or U.S. patent application Ser. No. 14/996,570, filed Jan. 15, 2016 and published Jul. 21, 2016 as U.S. Publication No. US-2016-0210853, which are hereby incorporated herein by reference in theft entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S.

Pat. Nos. 8,694,224; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 6,498,620; 5,670,935; 6,396,397; 6,806,452; 6,690,268; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,715,093; 6,922,292; 6,757,109; 6,717,610; 6,590,719; 6,201,642; 6,498,620; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 6,690,268 and/or 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Pat. No. 9,264,672, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, said vehicular control system comprising:

a plurality of sensors disposed at a vehicle equipped with said vehicular control system;

wherein said plurality of sensors at least comprises (i) a camera having a field of view exterior of the equipped vehicle, said camera capturing image data, and (ii) a 3D point-cloud LIDAR sensor having a field of sensing exterior of the equipped vehicle, said 3D point-cloud LIDAR sensor capturing 3D point-cloud LIDAR data;

wherein said camera comprises a forward-viewing camera and wherein said camera is disposed behind a windshield of the equipped vehicle and views through the windshield and forward of the equipped vehicle;

wherein said 3D point-cloud LIDAR sensor comprises a forward-sensing 3D point-cloud LIDAR sensor;

wherein the field of view of said camera at least encompasses (i) a traffic lane of a multi-lane road being traveled along by the equipped vehicle and (ii) another traffic lane of the multi-lane road;

wherein the field of sensing of said 3D point-cloud LIDAR sensor at least encompasses the other traffic lane of the multi-lane road;

a control comprising electronic circuitry;

wherein image data captured by said camera is provided to said control;

wherein 3D point-cloud LIDAR data captured by said 3D point-cloud LIDAR sensor is provided to said control;

wherein the electronic circuitry of said control comprises an image processor that processes image data captured by said camera;

wherein the electronic circuitry of said control comprises a data processor that processes 3D point-cloud LIDAR data captured by said 3D point-cloud LIDAR sensor; and wherein, responsive at least in part to (i) processing at said control of image data captured by said camera and (ii) processing at said control of 3D point-cloud LIDAR data captured by said 3D point-cloud LIDAR sensor, said control (a) determines presence of another vehicle present exterior of the equipped vehicle and approaching the equipped vehicle in the other traffic lane of the multi-lane road when the other vehicle is at least one selected from the group consisting of (i) in the field of view of said camera and (ii) in the field of sensing of said 3D point-cloud LIDAR sensor and (b) at least in part controls at least one vehicle function of the equipped vehicle.

2. The vehicular control system of claim 1, wherein said control determines, via processing at said control of 3D point-cloud LIDAR data captured by said 3D point-cloud LIDAR sensor, another vehicle that is not on the multi-lane road that is being traveled along by the equipped vehicle.

3. The vehicular control system of claim 2, wherein said control determines, via processing at said control of 3D point-cloud LIDAR data captured by said 3D point-cloud LIDAR sensor, that the determined other vehicle that is not on the multi-lane road being traveled by the equipped vehicle is approaching a road intersection ahead of the equipped vehicle.

4. The vehicular control system of claim 1, wherein the at least one vehicle function of the equipped vehicle comprises a headlighting function of the equipped vehicle.

5. The vehicular control system of claim 1, wherein the at least one vehicle function of the equipped vehicle comprises an adaptive cruise control function of the equipped vehicle.

6. The vehicular control system of claim 1, wherein said 3D point-cloud LIDAR sensor comprises a solid-state 3D point-cloud LIDAR sensor.

7. The vehicular control system of claim 1, wherein said camera comprises a photosensor array having at least one million photosensor elements arranged in a two-dimensional array of columns and rows.

8. The vehicular control system of claim 1, wherein said image processor comprises an image processing chip that utilizes object detection software for processing image data captured by said camera.

9. The vehicular control system of claim 1, wherein said control determines, via processing at said control of (i) image data captured by said camera and (ii) 3D point-cloud LIDAR data captured by said 3D point-cloud LIDAR sensor, that the determined other vehicle is not yet in the field of view of said camera.

10. The vehicular control system of claim 1, wherein the at least one vehicle function of the equipped vehicle comprises (i) a headlighting function of the equipped vehicle and (ii) an adaptive cruise control function of the equipped vehicle.

11. A vehicular control system, said vehicular control system comprising:

a plurality of sensors disposed at a vehicle equipped with said vehicular control system;

wherein said plurality of sensors at least comprises (i) a camera having a field of view exterior of the equipped vehicle, said camera capturing image data, and (ii) a 3D point-cloud LIDAR sensor having a field of sensing exterior of the equipped vehicle, said 3D point-cloud LIDAR sensor capturing 3D point-cloud LIDAR data;

wherein said camera comprises a forward-viewing camera and wherein said camera is disposed behind a windshield of the equipped vehicle and views through the windshield and forward of the equipped vehicle;

wherein said 3D point-cloud LIDAR sensor comprises a forward-sensing 3D point-cloud LIDAR sensor;

wherein said 3D point-cloud LIDAR sensor comprises a solid-state 3D point-cloud LIDAR sensor;

wherein the field of view of said camera at least encompasses (i) a traffic lane of a multi-lane road being traveled along by the equipped vehicle and (ii) another traffic lane of the multi-lane road;

wherein the field of sensing of said 3D point-cloud LIDAR sensor at least encompasses the other traffic lane of the multi-lane road;

a control comprising electronic circuitry;

wherein image data captured by said camera is provided to said control;

wherein 3D point-cloud LIDAR data captured by said 3D point-cloud LIDAR sensor is provided to said control;

wherein the electronic circuitry of said control comprises an image processor that processes image data captured by said camera;

wherein the electronic circuitry of said control comprises a data processor that processes 3D point-cloud LIDAR data captured by said 3D point-cloud LIDAR sensor;

wherein, responsive at least in part to (i) processing at said control of image data captured by said camera and (ii) processing at said control of 3D point-cloud LIDAR data captured by said 3D point-cloud LIDAR sensor, said control (a) determines presence of another vehicle present exterior of the equipped vehicle and approaching the equipped vehicle in the other traffic lane of the multi-lane road when the other vehicle is at least one selected from the group consisting of (i) in the field of view of said camera and (ii) in the field of sensing of said 3D point-cloud LIDAR sensor and (b) at least in part controls at least one vehicle function of the equipped vehicle; and wherein said control determines, via processing at said control of (i) image data captured by said camera and (ii) 3D point-cloud LIDAR data captured by said 3D point-cloud LIDAR sensor, that the determined other vehicle is not yet in the field of view of said camera.

12. The vehicular control system of claim 11, wherein said control determines, via processing at said control of 3D point-cloud LIDAR data captured by said 3D point-cloud LIDAR sensor, another vehicle that is not on the multi-lane road that is being traveled along by the equipped vehicle.

13. The vehicular control system of claim 12, wherein said control determines, via processing at said control of 3D point-cloud LIDAR data captured by said 3D point-cloud LIDAR sensor, that the determined other vehicle that is not on the multi-lane road being traveled by the equipped vehicle is approaching a road intersection ahead of the equipped vehicle.

14. The vehicular control system of claim 11, wherein the at least one vehicle function of the equipped vehicle comprises at least one selected from the group consisting of (i) a headlighting function of the equipped vehicle and (ii) an adaptive cruise control function of the equipped vehicle.

15. The vehicular control system of claim 11, wherein the at least one vehicle function of the equipped vehicle comprises (i) a headlighting function of the equipped vehicle and (ii) an adaptive cruise control function of the equipped vehicle.

16. A vehicular control system, said vehicular control system comprising:

a plurality of sensors disposed at a vehicle equipped with said vehicular control system;

wherein said plurality of sensors at least comprises (i) a camera having a field of view exterior of the equipped vehicle, said camera capturing image data, and (ii) a 3D point-cloud LIDAR sensor having a field of sensing exterior of the equipped vehicle, said 3D point-cloud LIDAR sensor capturing 3D point-cloud LIDAR data;

wherein said camera comprises a forward-viewing camera and wherein said camera is disposed behind a windshield of the equipped vehicle and views through the windshield and forward of the equipped vehicle;

wherein said camera comprises a photosensor array having at least one million photosensor elements arranged in a two-dimensional array of columns and rows;

wherein said 3D point-cloud LIDAR sensor comprises a forward-sensing 3D point-cloud LIDAR sensor;

wherein the field of view of said camera at least encompasses (i) a traffic lane of a multi-lane road being traveled along by the equipped vehicle and (ii) another traffic lane of the multi-lane road;

wherein the field of sensing of said 3D point-cloud LIDAR sensor at least encompasses the other traffic lane of the multi-lane road;

a control comprising electronic circuitry;

wherein image data captured by said camera is provided to said control;

wherein 3D point-cloud LIDAR data captured by said 3D point-cloud LIDAR sensor is provided to said control;

wherein the electronic circuitry of said control comprises an image processor that processes image data captured by said camera;

wherein said image processor comprises an image processing chip that utilizes object detection software for processing image data captured by said camera;

wherein the electronic circuitry of said control comprises a data processor that processes 3D point-cloud LIDAR data captured by said 3D point-cloud LIDAR sensor; and wherein, responsive at least in part to (i) processing at said control of image data captured by said camera and (ii) processing at said control of 3D point-cloud LIDAR data captured by said 3D point-cloud LIDAR sensor, said control (a) determines presence of another vehicle present exterior of the equipped vehicle and approaching the equipped vehicle in the other traffic lane of the multi-lane road when the other vehicle is at least one selected from the group consisting of (i) in the field of view of said camera and (ii) in the field of sensing of said 3D point-cloud LIDAR sensor and (b) at least in part controls at least one vehicle function of the equipped vehicle.

17. The vehicular control system of claim 16, wherein said control determines, via processing at said control of 3D point-cloud LIDAR data captured by said 3D point-cloud LIDAR sensor, another vehicle that is not on the multi-lane road that is being traveled along by the equipped vehicle, and wherein said control determines, via processing at said control of 3D point-cloud LIDAR data captured by said 3D point-cloud LIDAR sensor, that the determined other vehicle that is not on the multi-lane road being traveled by the equipped vehicle is approaching a road intersection ahead of the equipped vehicle.

18. The vehicular control system of claim 16, wherein the at least one vehicle function of the equipped vehicle comprises a headlighting function of the equipped vehicle.

19. The vehicular control system of claim 16, wherein the at least one vehicle function of the equipped vehicle comprises an adaptive cruise control function of the equipped vehicle.

20. The vehicular control system of claim 16, wherein said control determines, via processing at said control of (i) image data captured by said camera and (ii) 3D point-cloud LIDAR data captured by said 3D point-cloud LIDAR sensor, that the determined other vehicle is not yet in the field of view of said camera.

* * * * *

UNITED STATES PATENT AND TRADEMARK OFFICE
CERTIFICATE OF CORRECTION

PATENT NO. : 11,364,839 B2
APPLICATION NO. : 16/699893
DATED : June 21, 2022
INVENTOR(S) : Martin Solar et al.

It is certified that error appears in the above-identified patent and that said Letters Patent is hereby corrected as shown below:

In the Specification

Column 1
Line 39, "20124-0062743" should be --2012-0062743--

Column 6
Line 13, "theft" should be --their--

Signed and Sealed this
Nineteenth Day of July, 2022

Katherine Kelly Vidal
*Director of the United States Patent and Trademark Office*